United States Patent
Kumar et al.

(10) Patent No.: US 11,049,233 B2
(45) Date of Patent: Jun. 29, 2021

(54) SYSTEMS AND METHODS FOR DETECTING AND REPORTING VEHICLE DAMAGE EVENTS

(71) Applicant: Ford Global Technologies, LLC, Dearborn, MI (US)

(72) Inventors: Pankaj Kumar, Dearborn, MI (US); Hassene Jammoussi, Canton, MI (US); Imad Hassan Makki, Dearborn Heights, MI (US); Dimitar Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/247,189

(22) Filed: Jan. 14, 2019

(65) Prior Publication Data

US 2020/0226734 A1    Jul. 16, 2020

(51) Int. Cl.
*H04N 5/247* (2006.01)
*H04N 5/232* (2006.01)
*G06T 7/00* (2017.01)
*G07C 5/00* (2006.01)
*G07C 5/10* (2006.01)
*G07C 5/12* (2006.01)
*G07C 5/08* (2006.01)

(52) U.S. Cl.
CPC ............ *G06T 7/0002* (2013.01); *G07C 5/008* (2013.01); *G07C 5/0825* (2013.01); *G07C 5/10* (2013.01); *G07C 5/12* (2013.01); *H04N 5/23203* (2013.01); *H04N 5/23238* (2013.01); *H04N 5/247* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| 8,332,097 | B2 | 12/2012 | Chiba et al. |
| 9,323,993 | B2 | 4/2016 | Wang et al. |
| 2011/0069168 | A1 | 3/2011 | Tsou |
| 2016/0125673 | A1* | 5/2016 | Bromham ................ G07C 5/08 |
| | | | 701/115 |

(Continued)

OTHER PUBLICATIONS

"A Guide to Parked Recording with Dash Cameras." Car Cam Central (20 pages). Retrieved from https://carcamcentral.com/guide/guide-parked-recording-dash-cameras.

*Primary Examiner* — Dave Czekaj
*Assistant Examiner* — Samuel D Fereja
(74) *Attorney, Agent, or Firm* — Michael Spenner; Eversheds Sutherland (US) LLP (57) ABSTRACT

Systems and methods for detecting and reporting vehicle damage events are provided herein. An example method includes detecting any of a key-on or key-off event for a vehicle at a second point in time; in response to detecting the key-on or key-off event, obtaining a current set of images of one or more surfaces of the vehicle using one or more onboard cameras of the vehicle; accessing a baseline set of images for the vehicle obtained at a first point in time that precedes the second point in time; comparing the current set of images to the baseline set of images to determine damage to the one or more surfaces; and presenting a message through a human machine interface of the vehicle that is indicative of the damage.

20 Claims, 3 Drawing Sheets

(56) References Cited

U.S. PATENT DOCUMENTS

| | | |
|---|---|---|
| 2018/0072269 A1 | 3/2018 | Tong et al. |
| 2018/0260793 A1* | 9/2018 | Li .................... G06N 7/005 |
| 2018/0272992 A1* | 9/2018 | Gage ............... G06K 9/00771 |
| 2019/0095725 A1* | 3/2019 | Kalghatgi ............... B61L 3/008 |
| 2019/0213425 A1* | 7/2019 | Anderson .............. G06Q 40/08 |

* cited by examiner

SYSTEMS AND METHODS FOR DETECTING AND REPORTING VEHICLE DAMAGE EVENTS

TECHNICAL FIELD

The present disclosure relates to systems and methods that analyze vehicle damage events such as low-impact damage events, as well as identification of vehicle losses resulting therefrom.

BACKGROUND

Low-impact damage events can occur ubiquitously such as when a vehicle is parked in a parking lot. Other vehicles may impact the vehicle or even other objects such as a shopping cart. Generally, some low-impact damage events may occur when the vehicle owner or operator is absent. Thus, it is often difficult to identify when these damage events occur and/or identify a cause of such damage.

In more detail, vehicles are often left unattended in public areas, streets, or parking lots and are exposed to possible damage either intentionally or non-intentionally. Common problems observed with parked vehicles may include a car body scratched with a key by some miscreant, a valuable stolen from inside of the car, graffiti drawn on a vehicle, flat tires and a car bumped into the vehicle at a parking lot—just to name a few. Also, low-impact damage could also occur while the vehicle is being driven such as in a traffic jam situation. Often times these problems are exacerbated when an offending party does not leave insurance information. Often times an accident goes unnoticed, preventing timely repairs and insurance claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In some embodiments, systems and methods disclosed are utilized to obtain images of at least a portion of an exterior of a vehicle. These images can be obtained in a periodic or scheduled manner and can be used to detect vehicle damage. In one instance, the images are obtained at key-on and key-off events. A key-on event is indicative of an event where the vehicle is turned on, and conversely a key-off event is indicative of an event where the vehicle is turned off.

In some embodiments, one or more onboard cameras of a vehicle can be used to obtain images at these key-on and/or key-off events. In other embodiments, off-board cameras can be used to obtain images. One example embodiment of off-board cameras includes environmental infrastructure cameras such as those found in a smart city environment. In another embodiment, images can be obtained from cameras at local establishments that maintain video or image surveillance of an area including or near the subject vehicle. The cameras used in any given embodiment can vary in number and can include any type of camera that can obtain video and/or static images. In some embodiments, the camera can include a high-definition and/or light detection and ranging (LiDar) camera.

In some embodiments, a 360 degree snapshot of the vehicle is utilized. In other embodiments, images of the subject vehicle are obtained that focus on specific parts of the subject vehicle rather than a 360 degree snapshot.

The systems and methods herein can utilize advance machine learning and pattern recognition techniques, such as deep neural net based techniques, random forests, boosted trees, or naïve Bayesian, to compare before and after images for purposes of detecting low-impact damage events.

When a discrepancy is detected, a driver of the subject vehicle can be informed of potential damage to the vehicle highlighting an area of impact or damage identified by the systems and methods. If no discrepancy is detected, then no alerts are raised and a system of the present disclosure waits for next set of image(s).

In some embodiments, vehicle images obtained at future key-on and/or key off events may be compared with stored images during the previous event (key off or key on—respectively). In various embodiments, after the comparison is performed and a report is generated, subsequent images stored in memory can be updated with newer images to ensure that future analyses and comparisons are made using the most recently saved set of images. To be sure, images used herein can be obtained from static images or video.

A specific technological improvement and advantage provided by the disclosed systems and methods (when compared to shock sensor based methods commonly used for accident detection) is low energy requirements. Some embodiments of the systems and methods herein do not require impact sensors in general. Thus, these systems and methods do not require sensors that remain active all of time, thus draining battery. These and other aspects and advantages of the present disclosure are described in greater detail herein with reference to the collective drawings.

Illustrative Architecture

Figure 1:
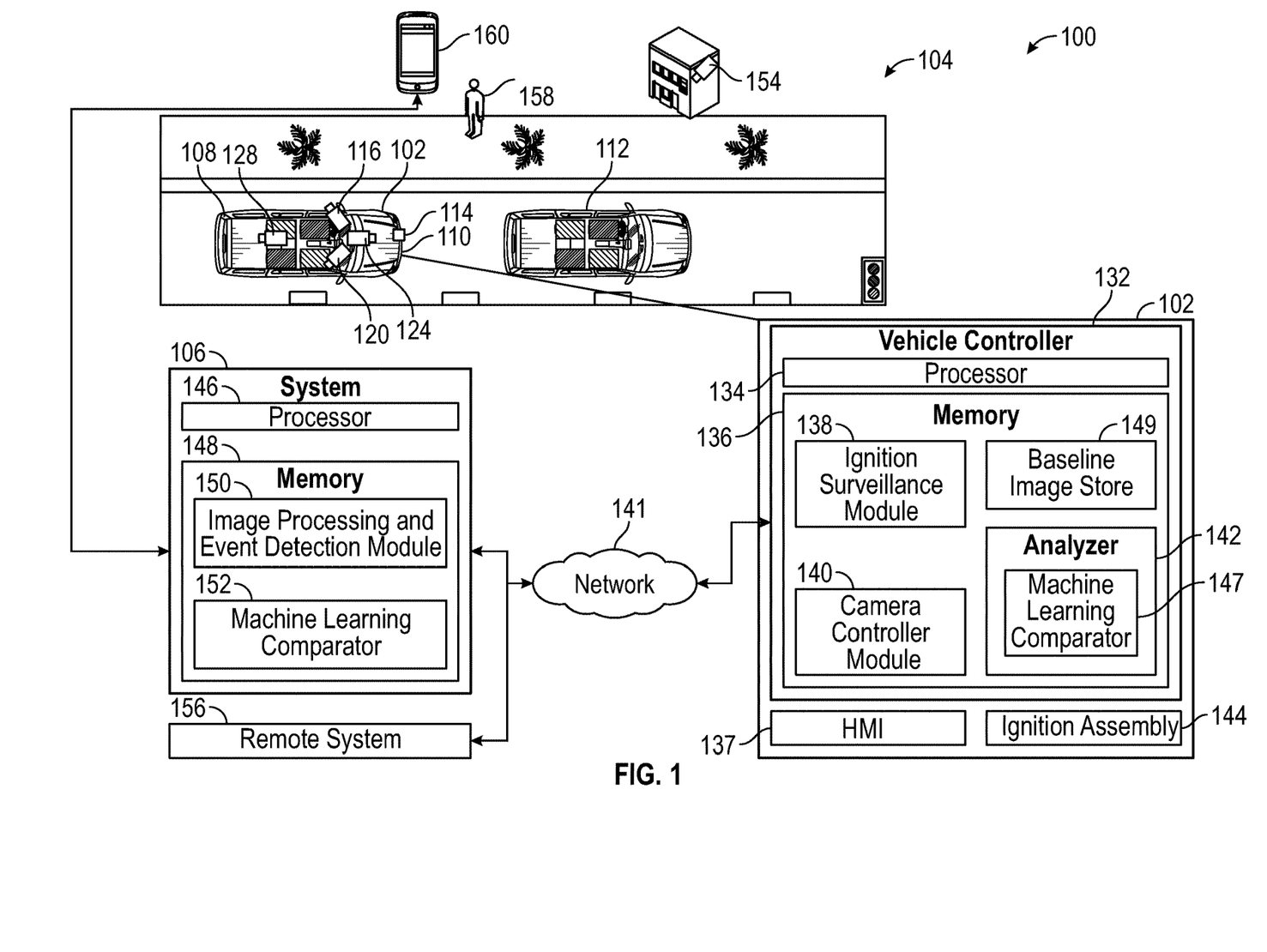
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a vehicle 102, an environmental infrastructure 104, and an image process and event detection system (hereinafter system 106).

In general, the vehicle 102 comprises a body 108, one or more cameras (enumerated and discussed below), and a vehicle controller 132. The vehicle controller 132 is illustrated in FIG. 1 schematically along with a portion of additional components of the vehicle.

In certain embodiments, the body 108 has of a plurality of surfaces, such as surface 110. These surfaces can include objects such as door panels, a hood, a trunk, a roof, windows, mirrors, and bumpers—just to name a few. To be sure, the surfaces can include any part of the vehicle 102 that can be subjected to damage. In one non-limiting example, the vehicle 102 is impacted on the surface 110 (such as a front bumper) by a second vehicle 112. In this example, the second vehicle 112 causes damage 114 to the surface 110. This is generally referred to herein as a low-impact damage event. In general, the damage 114 that is detectable using the systems and methods includes damage that is visually detectable or detectable through the use of machine-learning based image comparison. Example damage illustrations are illustrated and described in greater detail with reference to FIG. 2.

It will be understood that while the descriptor of low-impact has been used, the systems and methods herein are useful in any event where damage occurs to the vehicle 102 when the owner of the vehicle 102 is not present for the damage event. Thus, the systems and methods herein are not limited to detecting only low-impact damage but any visually discernible damage event that is not witnessed or readily detected by direct human observation.

In some embodiments, the vehicle 102 comprises one or more onboard cameras. For example, the vehicle 102 can comprise a camera in each of its side mirrors. In one embodiment, a first camera 116 is associated with a left side mirror and a second camera 120 is associated with a right side mirror. In other embodiments, a third camera 124 is associated with a front portion of the vehicle 102. For example, the third camera 124 could include a dashboard camera or a camera integrated into the rear-view mirror of the vehicle 102. In other embodiments, a fourth camera 128 is associated with a rear portion of the vehicle 102. For example, the fourth camera 128 could include a camera integrated into a wireless antenna of the vehicle 102. Other onboard cameras can be used such as a backup camera located near a rear of the vehicle 102. Collectively and broadly, any number of cameras can be used to create a 360 degree view (or less than 360 degree view) of the surfaces of the vehicle 102. Again, some embodiments contemplate surveilling and obtaining images of only a portion of the surfaces of the vehicle 102, rather than an entire 360 degree view. As noted above, each of these cameras can be configured to obtain video and/or static images.

The vehicle controller 132 is a specific purpose computing system that can comprise a processor 134, a memory 136, and optionally a human machine interface (HMI) 137, such as a touchscreen display or a voice control system. In general, the processor 134 executes instructions in the memory 136 to provide functionalities related to image capture and in some instances image analysis and reporting related to vehicle damage identification. That is, in some embodiments, the features disclosed herein can be performed entirely by the vehicle controller 132.

In some embodiments, the memory 136 of the vehicle controller 132 is configured with specific modules that collectively provide the functionalities disclosed herein. For example, the memory 136 comprises an ignition surveillance module 138, a camera controller module 140, and an image process and event detection module (hereinafter analyzer 142).

In general, the processor 134 executes the ignition surveillance module 138 to sense key-on and key-off events of an ignition assembly 144 of the vehicle 102. In some embodiments, rather than sensing operations of the ignition assembly 144 directly, the ignition surveillance module 138 can sense ignition events from another associated part of the vehicle such as an electronic control module of an engine of the vehicle 102, as would be known to one of ordinary skill in the art.

In some embodiments, when a key-on event and/or a key-off event is detected the processor 134 executes the camera controller module 140 to cause each of the cameras associated with the vehicle 102 to obtain one or more images. These images are referred to as a most recently obtained image set. In general, the most recently obtained image set is referred to generally as images associated with a second point in time.

Once images have been obtained, the processor 134 can execute the analyzer 142. In some embodiments, the analyzer 142 is configured to assemble a plurality of images obtained from a plurality of cameras of the vehicle 102 and to obtain a 360 degree view of the vehicle 102. In various embodiments, the analyzer 142 can comprise a machine learning comparator 147 that compares the recently obtained images with a most recent baseline image set stored in the memory 136, such as a baseline image store 149. In general, the most recent baseline image set is referred to generally as images associated with a first point in time. As noted above, the most recent baseline image set can include a last set of images obtained for the vehicle 102 during a most recent key-on or key-off event. In some embodiments, each time that images are obtained for the vehicle 102, the images are time-stamped. Also, the memory 136 can store multiple baseline image sets allowing for comparison with older sets of baseline image sets being made available if the most recent baseline image set is corrupted or otherwise unavailable.

To be sure, the most recent baseline image set has been analyzed using the machine learning comparator 147 in a prior process. That is, the images of the most recent baseline image set have been analyzed to determine the visual features of the surfaces of the vehicle 102. In some embodiments, the machine learning comparator 147 creates a model of the surfaces of the vehicle 102 from the baseline image set. This model is used for comparisons in some embodiments.

In various embodiments, the machine learning comparator 147 utilizes a machine learning algorithm configured to detect surface damage such as dents, scrapes, paint discoloration, holes, and other types of surface damage. That is, rather than, or in addition to using surface modeling, the machine learning comparator 147 can be trained on example images that include and do not include surface damage to vehicle components. Thus, the machine learning comparator 147 learns example damage patterns that are indicative of dents, scrapes, paint discoloration, holes, and other types of surface damage.

In general, the machine learning comparator 147 compares the most recent baseline image set with the most recently obtained image set. This process involves analyzing the visual features of the surfaces of the vehicle 102 in the most recently obtained image set. Once the images have been processed, the data is compared against the current baseline image set to determine any discrepancies therebetween.

In general, the analyzer 142 compares a first set of images obtained at a first point in time with a second set of images obtained at a second point in time using machine learning processes to detect damage to a vehicle. In some embodiments, this process includes comparing the first set of images to the second set of images to determine damage to the one or more surfaces using a machine learning algorithm configured to detect surface damage.

In general, images are obtained of the vehicle 102 at each future key-on/key-off event. Thus, the second set of images is obtained at each future key-on or key-off event, and the first set of images comprises a most recent baseline set of images that were obtained and stored based on a prior key-on or key-off event (such as the key-on or key-off event that immediately precedes a current or future key-on or key-off event).

In various embodiments, when damage is detected, the processor 134 can provide a warning message through the human machine interface 137 to the driver that the vehicle 102 has been damaged. The processor 134 can identify on the human machine interface 137 where the damage has occurred on the vehicle 102 as well as using the surface identified by the analyzer 142. In various embodiments, the processor 134 can transmit a damage report to an interested party such as the driver, an insurer, or emergency responders—just to name a few. In some embodiments, the processor 134 can transmit damage reports over a network 141. In general, the network 141 allows for components within the architecture 100 to communicate with one another. The network 141 may include any one or a combination of multiple different types of networks, such as cable networks, the Internet, wireless networks, and other private and/or public networks. In some instances, the network 141 may include cellular, Wi-Fi, or Wi-Fi direct. One example communication path can include the vehicle controller 132 to the system 106.

In some embodiments, the photographs or images can be obtained over the network from vehicle-to-vehicle (V2V) or vehicle-to-infrastructure (V2I) communications. For example, an image or picture of the vehicle 102 can be obtained from an adjacent vehicle fitted with onboard camera. The vehicle controller 132 can request an image or images from an adjacent vehicle using V2V communications. Rather than using the network 141, the vehicles can communicate with one another over any suitable short-range wireless network as well. V2I communications can also take place over a short-range wireless network in lieu of or in addition to using the network 141.

Figure 2:
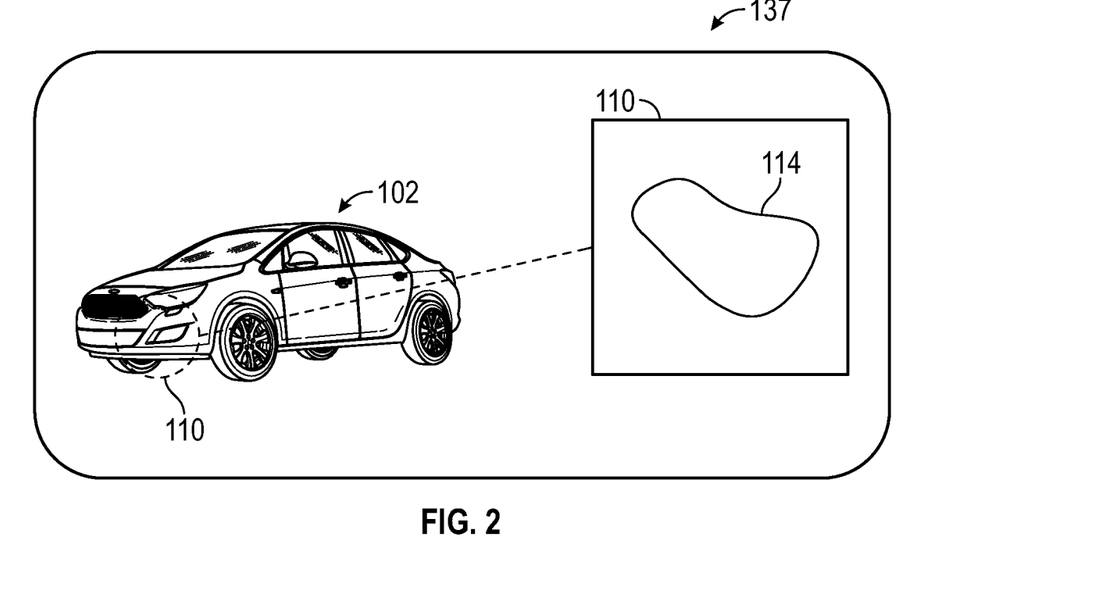
FIG. 2 illustrates the depiction of a damaged area of a vehicle on a human machine interface.

FIG. 2 illustrates a message that indicates the detection of the damage 114 on the surface 110 of the vehicle 102 when comparing between an image of the surface 110 included in a most recent baseline image set against an image of the surface 110 included in a most recently obtained image set. The message is displayed on the human machine interface 137.

Referring back to FIG. 1, according to some embodiments, the system 106 can include the image capture and processing capabilities disclosed with respect to the vehicle controller 132. That is, the system 106 can also include a processor 146 and a memory 148. Generally the memory 148 comprises an image processing and event detection module 150 having a machine learning comparator 152. The image processing and event detection module 150, having a machine learning comparator 152, has equivalent functionalities to those disclosed above with respect to the analyzer 142 and the machine learning comparator 147. In some embodiments, the system 106 could include a server. In other embodiments, the system 106 could include a cloud or container-based process system.

Thus, some embodiments allow for cooperative process control between the vehicle controller 132 and the system 106. For example, the vehicle controller 132 can implement the ignition surveillance module 138 and the camera controller module 140. The vehicle controller 132 can transmit images to the system 106 for processing and/or analysis. In another embodiment, the vehicle controller 132 can transmit images to a remote system 156. The remote system 156 could include, for example, a computing system for an insurer or a computing system used by emergency responders.

In FIG. 1, in addition to the onboard cameras on the vehicle 102, images can also be obtained and processed from one or more off-board cameras associated with the environmental infrastructure 104. This process can provide advantages when the vehicle 102 lacks sufficient onboard cameras to obtain images of the vehicle or certain surfaces thereof. For example, onboard cameras may not be able to sufficiently image the roof panel surfaces of the vehicle. Despite the reason, the systems and methods herein can utilize images obtained by cameras, such as a camera 154 associated with the environmental infrastructure 104. When the system 106 is used to process images, the system 106 can identify a time-stamp associated with an image obtained from the environmental infrastructure 104. In other embodiments, the vehicle controller 132 can be configured to communicate with the camera 154 of the environmental infrastructure 104 over the network 141 and instruct the camera 154 to obtain an image during a key-on and/or key-off event, or approximately when the onboard cameras of the vehicle 102 are obtaining images.

In addition to images that include views of the surfaces of the vehicle, some onboard vehicle cameras or cameras associated with the environmental infrastructure 104 can obtain images of a general area where the vehicle 102 is positioned. The system 106 can be configured to process these images to identify features such as vehicles, license plates, human faces or other features of objects near the vehicle 102. When damage to the vehicle 102 is detected, the system 106 can process these general area images to identify potential perpetrators and/or witnesses. For example, if a security camera video is obtained of the general area around the vehicle 102, the system 106 may identify the second vehicle 112 and also a license plate associated with the second vehicle 112.

According to some embodiments, a driver 158 of the vehicle 102 may utilize a smartphone 160 to obtain images of the vehicle 102. These images can be used in combination with images obtained from the onboard cameras of the vehicle 102. The vehicle controller 132 of the vehicle 102 or the system 106 can receive these images from the smartphone 160 and can associate them with a current key-on or key-off event. The smartphone 160 may obtain images of the vehicle 102 that have a higher definition than those provided by the onboard cameras of the vehicle 102. In some instances, when the analyzer 142 of the vehicle controller 132 (or the system 106) finds an area of the vehicle 102 that appears to be damaged but the analyzer 142 cannot make a definitive determination, the vehicle controller 132 may instruct the driver 158 to obtain additional images with his/her smartphone 160. These additional images can be used to confirm or reject the possible damage to the vehicle.

Illustrative Methods and Operations

Figure 3:
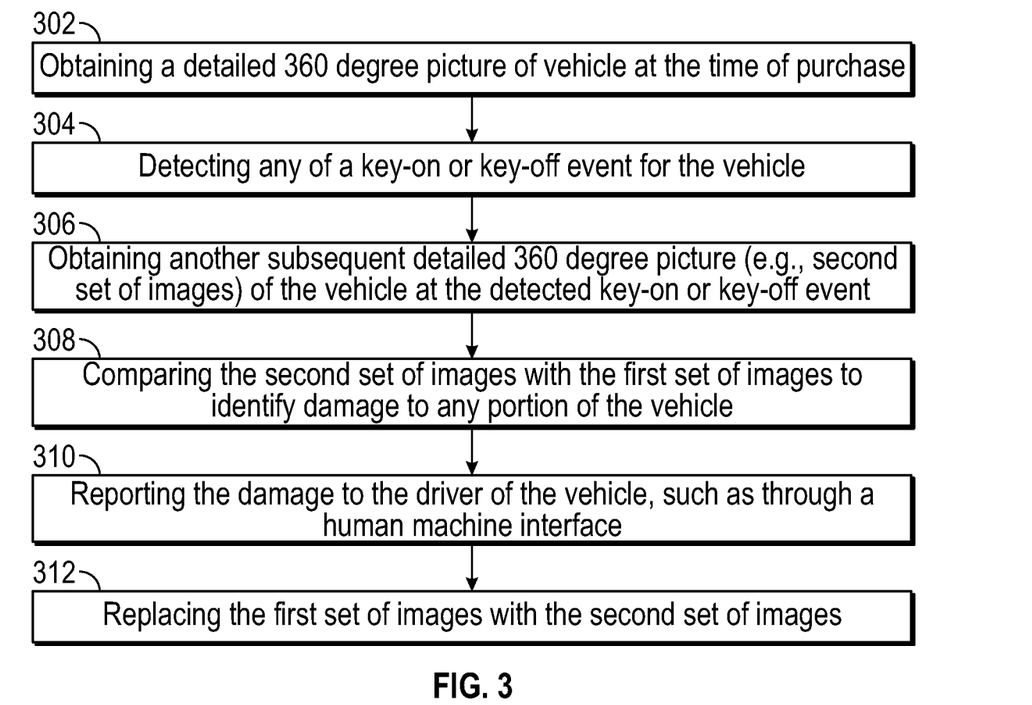
FIG. 3 is a flowchart of an example method of the present disclosure.

The following descriptions provide additional details on the functional and methodological aspects of the present disclosure provided through the architectures and/or systems disclosed above. FIG. 3 is a flowchart of an example method of the present disclosure. The method generally includes a step 302 of obtaining a detailed 360 degree picture of a vehicle at the time of purchase. This set of images is referred to as a first set of images or a baseline set of images. These images are assembled and stored in the memory of the vehicle and/or a remote system. This step can be performed at the dealership or by a vehicle manufacturer.

Next, the method includes a step 304 of detecting any of a key-on or key-off event for the vehicle. In response to this key-on or key-off event, the method includes a step 306 of obtaining another subsequent detailed 360 degree picture (e.g., second set of images) of the vehicle at the detected key-on or key-off event. This step can include determining ignition events and causing onboard vehicle cameras to obtain a second set of images. In other embodiments, a driver or other individual can obtain images of the vehicle using his/her smartphone and transmit those images to a server or cloud of the present disclosure.

As noted herein, the method can include a step 308 of comparing the second set of images with the first set of images to identify damage to any portion of the vehicle. If damage is identified, the method can include a step 310 of reporting the damage to the driver of the vehicle, such as through a human machine interface.

In some embodiments, the method includes a step 312 of replacing the first set of images with the second set of images. The second set of images, referred to as the current set of images, replaces the first set of images, referred to as the baseline set of images so that the second set of images now becomes the baseline set of images. At each subsequent key-on or key-off event, the method is repeated from step 304 to step 312.

Figure 4:
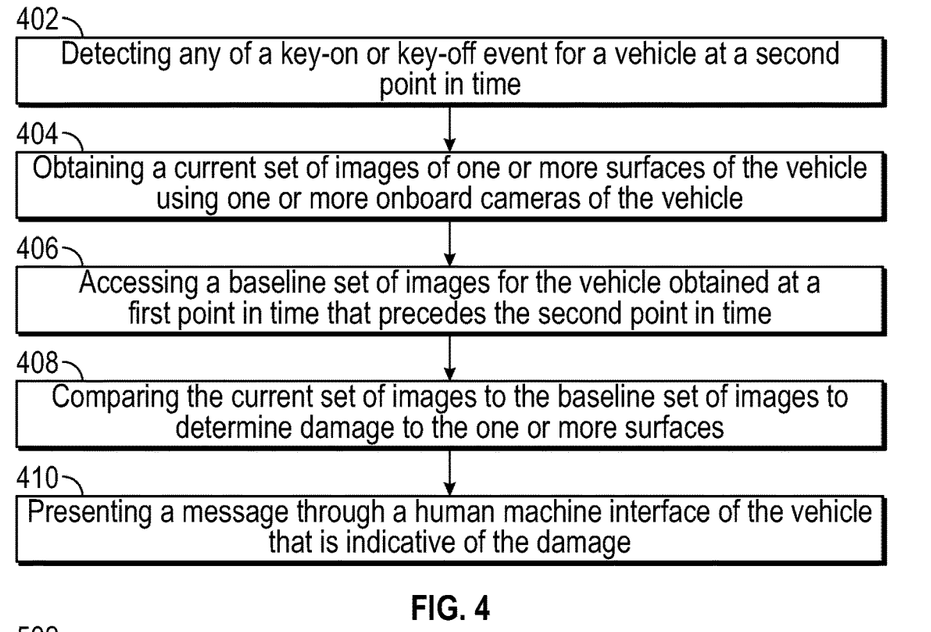
FIG. 4 is a flowchart of another example method of the present disclosure.

FIG. 4 is a flowchart of another example method of the present disclosure. The method can include a step 402 of detecting any of a key-on or key-off event for a vehicle at a second point in time. It will be understood that the second point in time refers to a time frame that occurs after a baseline set of images for the vehicle was obtained. In some embodiments, the baseline set of images for the vehicle was obtained at a most recent, past key-on or key-off event.

In response to detecting the key-on or key-off event, the method includes a step 404 of obtaining a current set of images of one or more surfaces of the vehicle using one or more onboard cameras of the vehicle. As noted above, this can include activating onboard cameras for the vehicle as well as off-board cameras around the vehicle. In some embodiments, images are obtained from a mobile device as well.

In various embodiments, the method includes a step 406 of accessing a baseline set of images for the vehicle obtained at a first point in time that precedes the second point in time. Next, the method can include a step 408 of comparing the current set of images to the baseline set of images to determine damage to the one or more surfaces. To be sure, this process can be performed using a machine learning or artificial intelligence system that has been trained to detect damage to vehicle surfaces. In some embodiments, this can include utilizing advance machine learning and pattern recognition techniques, such as deep neural net based techniques, random forests, boosted trees, or naïve Bayesian, to compare before and after images for purposes of detecting low-impact damage events. When damage is detected, the method can comprise a step 410 of presenting a message through a human machine interface of the vehicle that is indicative of the damage.

As noted above, the current set of images can be obtained at each key-on or key-off event, and the baseline set of images comprises a most recent baseline image set that was obtained of the vehicle and stored in memory of the vehicle. This process allows for iterative replacement of the baseline set of images over time with newer sets of images tied to key-on and key-off events.

In various embodiments, the method can comprise transmitting the message to a remote system. In some embodiments, the message can include the current set of images and the baseline set of images. When damage is detected, an area of damage is identified on the current set of images. The remote system can include, for example, an insurer or an emergency response system.

In some embodiments, images are time-stamped, and the images can form a 360 degree view of the one or more surfaces of the vehicle. In other embodiments, images for less than a 360 degree view of the vehicle are obtained.

Figure 5:
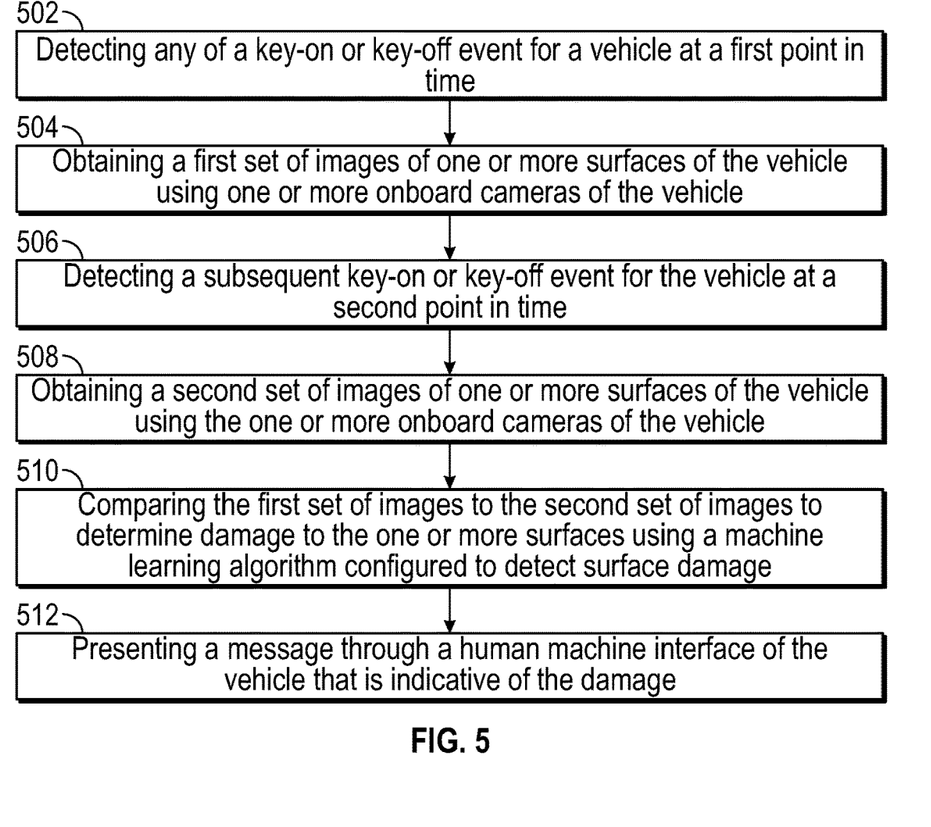
FIG. 5 is a flowchart of yet another example method of the present disclosure.

FIG. 5 illustrates another example method of the present disclosure that comprises a step 502 of detecting any of a key-on or key-off event for a vehicle at a first point in time. Next, in response to detecting the key-on or key-off event, the method can include a step 504 of obtaining a first set of images of one or more surfaces of the vehicle using one or more onboard cameras of the vehicle. In various embodiments, the method may include a step 506 of detecting a subsequent key-on or key-off event for the vehicle at a second point in time. In various embodiments, in response to detecting the subsequent key-on or key-off event, the method includes a step 508 of obtaining a second set of images of one or more surfaces of the vehicle using the one or more onboard cameras of the vehicle. In one or more embodiments, the method includes a step 510 of comparing the first set of images to the second set of images to determine damage to the one or more surfaces using a machine learning algorithm configured to detect surface damage. In some embodiments, the method can include a step 512 of presenting a message through a human machine interface of the vehicle that is indicative of the damage.

Example Embodiments

In some instances, the following examples may be implemented together or separately by the systems and methods described herein.

Example 1 may include a method, comprising: detecting any of a key-on or key-off event for a vehicle; in response to detecting the key-on or key-off event, obtaining a current set of images of one or more surfaces of the vehicle using one or more onboard cameras of the vehicle; obtaining a baseline set of images for the vehicle; comparing the current set of images to the baseline set of images to determine damage to the one or more surfaces; and presenting a message through a human machine interface of the vehicle that is indicative of the damage.

Example 2 may include the method according to example 1, wherein the current set of images is obtained at each key-on or key-off event and the baseline set of images comprises a most recent baseline image set that was obtained of the vehicle and stored in a memory of the vehicle.

Example 3 may include the method according to example 1 and/or some other example herein, further comprising obtaining images from an infrastructural camera that is off-board of the vehicle.

Example 4 may include the method according to example 1 and/or some other example herein, further comprising transmitting a message to a remote system, the message comprising the current set of images and the baseline set of images, wherein an area of damage is identified on the current set of images.

Example 5 may include the method according to example 1 and/or some other example herein, further comprising time-stamping any of the current set of images and the baseline set of images.

Example 6 may include the method according to example 1 and/or some other example herein, wherein the current set of images and the baseline set of images comprise a 360 degree view of the one or more surfaces of the vehicle.

Example 7 may include the method according to example 1 and/or some other example herein, wherein the current set of images is obtained at a second point in time and the baseline set of images is obtained at a first point in time that precedes the second point in time.

Example 8 may include a method, comprising: detecting any of a key-on or key-off event for a vehicle at a first point in time; in response to detecting the key-on or key-off event, obtaining a first set of images of one or more surfaces of the vehicle using one or more onboard cameras of the vehicle; detecting a subsequent key-on or key-off event for the vehicle at a second point in time; in response to detecting the subsequent key-on or key-off event, obtaining a second set of images of the one or more surfaces of the vehicle using the one or more onboard cameras of the vehicle; comparing the first set of images to the second set of images to determine damage to the one or more surfaces using a machine learning algorithm configured to detect surface damage; and presenting a message through a human machine interface of the vehicle that is indicative of the damage.

Example 9 may include the method according to example 8, wherein the first set of images and the second set of images each comprise a 360 degree view of the one or more surfaces of the vehicle.

Example 10 may include the method according to example 8 and/or some other example herein, further comprising transmitting the message to a remote system, the message comprising the first set of images and the second set of images, wherein an area of damage is identified on the second set of images.

Example 11 may include a system, comprising: a vehicle comprising an ignition system, one or more onboard cameras, a human machine interface, and a vehicle controller, wherein the vehicle controller comprises a processor that is configured to: execute an ignition surveillance module to detect key-on or key-off events; and in response to the key-on or key-off events, execute a camera controller module to activate the one or more onboard cameras to obtain a second set of images of the vehicle; and an analyzer configured to: obtain a first set of images that is stored in memory; compare the first set of images with the second set of images to identify damage to the vehicle; and generate a message for display on the human machine interface that is indicative of the damage.

Example 12 may include the system according to example 11, further comprising a machine learning comparator of the analyzer that compares the first set of images with the second set of images, wherein the machine learning comparator implements a machine learning algorithm configured to detect vehicle damage.

Example 13 may include the system according to example 11 and/or some other example herein, wherein the analyzer is a module that is executable by the vehicle controller.

Example 14 may include the system according to example 11 and/or some other example herein, wherein the analyzer is located on a server or a cloud that is remote to the vehicle, wherein the vehicle controller transmits the second set of images to the server or the cloud and the first set of images that is stored in the memory of the server or the cloud.

Example 15 may include the system according to example 11 and/or some other example herein, wherein the vehicle controller is configured to obtain the second set of images at each future key-on or key-off event and the first of images comprises a most recent baseline image set that was obtained and stored based on a prior key-on or key-off event.

Example 16 may include the system according to example 11 and/or some other example herein, wherein the vehicle controller is configured to obtain images from an infrastructural camera that is off-board relative to the vehicle, wherein the images from the infrastructural camera are utilized in the comparison to identify damage to the vehicle.

Example 17 may include the system according to example 11 and/or some other example herein, wherein the vehicle controller is configured to transmit the message to a remote system, the message comprising the first set images and the second set of images, wherein an area of damage is identified on the second set of images.

Example 18 may include the system according to example 11 and/or some other example herein, wherein the vehicle controller is configured to time-stamp the second set of images.

Example 19 may include the system according to example 11 and/or some other example herein, wherein any of the first set of images and the second set of images comprise a 360 degree view of the vehicle.

Example 20 may include the system according to example 11 and/or some other example herein, wherein the message that is displayed on the human machine interface comprises one of the images of the second set of images with the damage being identified.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
  detecting a first key-on or key-off event for a vehicle;
  in response to detecting the first key-on or key-off event, obtaining a first set of images of one or more surfaces of the vehicle using one or more onboard cameras of the vehicle, the first set of images being a baseline set of images;

detecting a second key-on or key-off event for the vehicle, the second key-on or key-off event taking place subsequent to the first key-on or key-off event;

in response to detecting the second key-on or key-off event, obtaining a second set of images of the one or more surfaces of the vehicle using the one or more onboard cameras of the vehicle, the second set of images being a current set of images;

comparing the current set of images to the baseline set of images to determine damage to the one or more surfaces; and presenting a message through a human machine interface of the vehicle that is indicative of the damage.

2. The method according to claim 1, wherein the current set of images is obtained at each key-on or key-off event and the baseline set of images comprises a most recent baseline image set that was obtained of the vehicle and stored in a memory of the vehicle.

3. The method according to claim 1, further comprising obtaining images from an infrastructural camera that is off-board of the vehicle.

4. The method according to claim 1, further comprising transmitting a message to a remote system, the message comprising the current set of images and the baseline set of images, wherein an area of damage is identified on the current set of images.

5. The method according to claim 1, further comprising time-stamping any of the current set of images and the baseline set of images.

6. The method according to claim 1, wherein the current set of images and the baseline set of images comprise a 360 degree view of the one or more surfaces of the vehicle.

7. The method according to claim 1, wherein the current set of images is obtained at a second point in time and the baseline set of images is obtained at a first point in time that precedes the second point in time.

8. A method, comprising:
 detecting a first key-on or key-off event for a vehicle at a first point in time;
 in response to detecting the first key-on or key-off event, obtaining a first set of images of one or more surfaces of the vehicle using one or more onboard cameras of the vehicle, the first set of images being a baseline set of images;
 detecting a subsequent key-on or key-off event for the vehicle at a second point in time;
 in response to detecting the subsequent key-on or key-off event, obtaining a second set of images of the one or more surfaces of the vehicle using the one or more onboard cameras of the vehicle, the second set of images being a current set of images;
 comparing the first set of images to the second set of images to determine damage to the one or more surfaces using a machine learning algorithm configured to detect surface damage; and
 presenting a message through a human machine interface of the vehicle that is indicative of the damage.

9. The method according to claim 8, wherein the first set of images and the second set of images each comprise a 360 degree view of the one or more surfaces of the vehicle.

10. The method according to claim 8, further comprising transmitting the message to a remote system, the message comprising the first set of images and the second set of images, wherein an area of damage is identified on the second set of images.

11. A system, comprising:
 a vehicle comprising an ignition system, one or more onboard cameras, a human machine interface, and a vehicle controller, wherein the vehicle controller comprises a processor that is configured to:
  execute an ignition surveillance module to detect a first key-on or key-off event and a second key-on or key-off event, wherein the second key-on or key-off event is subsequent to the first key-on or key-off event; and
  in response to the first key-on or key-off event, execute a camera controller module to activate the one or more onboard cameras to obtain a first set of images of the vehicle, wherein the first set of images is a baseline set of images;
  in response to the second key-on or key-off event, execute a camera controller module to activate the one or more onboard cameras to obtain a second set of images of the vehicle, wherein the second set of images is a current set of images; and an analyzer configured to:
  compare the first set of images with the second set of images to identify damage to the vehicle; and
  generate a message for display on the human machine interface that is indicative of the damage.

12. The system according to claim 11, further comprising a machine learning comparator of the analyzer that compares the first set of images with the second set of images, wherein the machine learning comparator implements a machine learning algorithm configured to detect vehicle damage.

13. The system according to claim 11, wherein the analyzer is a module that is executable by the vehicle controller.

14. The system according to claim 11, wherein the analyzer is located on a server or a cloud that is remote to the vehicle, wherein the vehicle controller transmits the second set of images to the server or the cloud and the first set of images that is stored in the memory of the server or the cloud.

15. The system according to claim 11, wherein the vehicle controller is configured to obtain the second set of images at each future key-on or key-off event and the first set of images comprises a most recent baseline image set that was obtained and stored based on a prior key-on or key-off event.

16. The system according to claim 11, wherein the vehicle controller is configured to obtain images from an infrastructural camera that is off-board relative to the vehicle, wherein the images from the infrastructural camera are utilized in the comparison to identify damage to the vehicle.

17. The system according to claim 11, wherein the vehicle controller is configured to transmit the message to a remote system, the message comprising the first set of images and the second set of images, wherein an area of damage is identified on the second set of images.

18. The system according to claim 11, wherein the vehicle controller is configured to time-stamp the second set of images.

19. The system according to claim 11, wherein any of the first set of images and the second set of images comprise a 360 degree view of the vehicle.

20. The system according to claim 11, wherein the message that is displayed on the human machine interface comprises one of the images of the second set of images with the damage being identified.

\* \* \* \* \*